United States Patent
Tobón et al.

(10) Patent No.: US 10,450,232 B2
(45) Date of Patent: Oct. 22, 2019

(54) CEMENT FORMULATION BASED ON ALUMINIUM SULPHATE WITH A SPECIFIC PROPORTION OF YE'ELIMITE SYSTEMS

(71) Applicants: UNIVERSIDAD NACIONAL DE COLOMBIA, Bogotá (CO); CEMENTOS ARGOS S.A., Medellin (CO)

(72) Inventors: Jorge Iván Tobón, Bogotá (CO); Carolina Giraldo Torres, Bogotá (CO); Ariel Berrio Solarte, Bogotá (CO); Diana Londoño Zuluaga, Bogota (CO)

(73) Assignees: Universidad Nacional de Colombia, Bogota (CO); Cementos Argos S.A., Medellin (CO)

( * ) Notice: Subject to any disclaimer, the term of this patent is extended or adjusted under 35 U.S.C. 154(b) by 137 days.

(21) Appl. No.: 15/532,905

(22) PCT Filed: Dec. 3, 2015

(86) PCT No.: PCT/IB2015/059335
§ 371 (c)(1),
(2) Date: Jul. 26, 2017

(87) PCT Pub. No.: WO2016/088083
PCT Pub. Date: Jun. 9, 2016

(65) Prior Publication Data
US 2018/0265410 A1 Sep. 20, 2018

(30) Foreign Application Priority Data
Dec. 3, 2014 (CO) .................................. 14-265789

(51) Int. Cl.
*C04B 28/16* (2006.01)
*C04B 28/06* (2006.01)
*C04B 7/32* (2006.01)
*C04B 11/30* (2006.01)
*C04B 14/06* (2006.01)

(52) U.S. Cl.
CPC ............. *C04B 28/16* (2013.01); *C04B 7/32* (2013.01); *C04B 11/30* (2013.01); *C04B 14/06* (2013.01); *C04B 28/06* (2013.01)

(58) Field of Classification Search
CPC ........... C04B 28/16; C04B 28/06; C04B 7/32; C04B 11/30; C04B 14/06
See application file for complete search history.

(56) References Cited

U.S. PATENT DOCUMENTS

| | | | | |
|---|---|---|---|---|
| 6,730,162 B1* | 5/2004 | Li | ............................ | C04B 28/14 106/695 |
| 7,618,490 B2* | 11/2009 | Nakashima | ............ | C04B 22/126 106/724 |
| 8,123,854 B2* | 2/2012 | Cassat | .................... | C04B 18/021 106/692 |
| 8,153,552 B2* | 4/2012 | Cau Dit Coumes | ..... | C04B 14/06 502/407 |
| 9,630,878 B2* | 4/2017 | Raz | .......................... | C04B 28/08 |
| 9,850,168 B2* | 12/2017 | Gartner | ................ | C04B 40/0032 |
| 9,890,079 B2* | 2/2018 | Raz | .......................... | C04B 28/08 |
| 2013/0233207 A1* | 9/2013 | Marchi | .................... | C04B 7/323 106/693 |

FOREIGN PATENT DOCUMENTS

EP 2842924 A1 * 3/2015 ............... C04B 7/32
WO 2011158109 A1 12/2011

OTHER PUBLICATIONS

Alonso-Lopez, Doctoral Thesis, Behavior and compatibility of cements and policarboxilate based superplastificating additives. Effect of the nature of the cements and the structure of the additives. Universidad Autonoma De Madrid, Facultad de Ciencias, Dpto. de Quimica Inorganica. (2011).
Alvarez-Pinazo, et al., Rietveld quantitative phase analysis of Yeelimite-containing cements, Cement and Concrete Research 42:960-971 (2012).
Aranda and De La Torre, Sulfoaluminate Cement, Eco-Efficient Concrete, 18: 488-522 (Woodhead Publishing Ltd., 2013).
Bernardo, et al., A porosimetric study of calcium sulfoaluminate cement pastes cured at early ages, Cement and Concrete Research 36:1042-47 (2006).
Garcia-Mate, et al., Effect of calcium sulfate source on the hydration of calcium sulfoaluminate eco-cement, Cement & Concrete Composites 55:53-61 (2015).
Gartner, Ellis; Industrially interesting approaches to "low-CO2" cements; Cement and Concrete Research 34:1489-1498 (2004).
Pera J., Ambroise, J.; New applications of calcium sulfoaluminate cement, Cement and Concrete Research, 34:671-676 (2004).
Pera, J, Thermal Behaviour of Materials Based on Calcium Sulfoaluminate Cement, Proceedings. Abstract del Congreso de Quimica del cemento. ICCC 2007.
Tzouvalas, et. al.; Alternative calcium sulfate-bearing materials as cement retarders Part I. Anhydrite, Cement and Concrete Research 34:2113-2118 (2004).
ASTM International, Designation: C150/C150 M—19a Standard Specification for Portland, norm, Apr. 12, 2019, United States.

* cited by examiner

*Primary Examiner* — Anthony J Green
(74) *Attorney, Agent, or Firm* — The Morales Law Firm; Joseph L. Morales

(57) ABSTRACT

The present invention corresponds to a cement formulation based on sulfoaluminate comprising a specific Ye'elimite crystal proportion having enhanced mechanical resistance, setting and low CO2 emission features. A concrete obtained when mixing said formulation with water and gypsum is further described, having a superior performance at initial ages compared to concrete obtained from Portland cement.

9 Claims, 2 Drawing Sheets

CEMENT FORMULATION BASED ON ALUMINIUM SULPHATE WITH A SPECIFIC PROPORTION OF YE'ELIMITE SYSTEMS

1. FIELD OF THE INVENTION

The present invention relates with the chemical engineering field; specifically with the field of engineering materials, applied mineralogy, and more preferably with the development of cement ecological formulations based on aluminum sulfate having enhanced physical and chemical features. The present invention's specific application is in the civil engineering, construction and mining sectors, among others.

2. PRIOR ART

The cement industry has undergone permanent growth worldwide, particularly in recent years. Its global production has increased from $3.06 \times 10^9$ tons in 2009 to $3.6 \times 10^9$ tons in 2012. Since the beginning of the XXI century, Portland cement has remained in the spotlight in large-scale cement production.

Portland cement is the most used construction hydraulic binder, which upon mixing with arids, water and discontinuous and discreet steel rods has the feature of forming a resistant and lasting petrous mass known as concrete. Hydraulic cement has the characteristic of setting and hardening in the presence of water, which upon reacting with water forms a substance with good binding features.

However, the manufacturing process of Portland cement requires large amounts of energy. Portland clinker (Portland cement's main constituent) forms after calcining limestone and clay at a temperature in the range of 1350° to 1450° C.

Said clinker is the kiln product that is grounded in order to produce Portland cement. Thereby, the manufacturing process of said Portland cement requires large amounts of energy (about 3.6 GJ/t of clinker) and of raw material (1.6 ton of raw material per ton of clinker). At a global scale, it has been considered as the main cause for high consumption of non-renewable mineral resources and increased emission of greenhouse gases.

Consequently, the mitigation of negative effects in cement production has become a priority for the cement industry and the development of new products, which decrease the harmful effects on the environment, is paramount. Currently, cement production contributes with more than 5% of the $CO_2$ emissions worldwide, which constitutes the main challenge to be solved in the cement industry.

Cements based on calcium sulfoaluminate (CSA) were originated in China, around 1960, as a low energy alternative to the traditional or Portland cement. These cements are obtained from clinkers including a compound named Ye'elimite as the primary crystalline phase. Theoretically, the manufacture of a cement based on 100% Ye'elimite allows for a 51% reduction in $CO_2$ emissions, compared to the manufacture of 100% $C_3S$ or Portland cement.

Ye'elimite is a crystalline solid state reaction product compound of $CaO$, $Al_2O_3$, $SO_3$, which can crystallize in different systems (cubic and orthorhombic). The compound upon hydration, produces a family of crystalline phases known as ettringite. For the case of the CSA-based cement, it is the reason behind the strength development at early ages of said material.

When hydrating Ye'elimite in the presence of gypsum, it forms hydrated calcium trisulfoaluminate, identified as C3As3H32 within the cement industry, which is equivalent to $(CaO)_3(Al_2O_3)(CaSO_4)_3 \cdot 32H_2O$, known as ettringite or AFt. This reaction is responsible for the high mechanical strength in this type of cement. The ettringite product of this hydration increases the material's volume, feature that allows compensating the characteristic shrinkage of traditional cements. This Ye'elimite phase is crucial for defining the initial strength, settings, expansion and other cement features.

Moreover, energy requirements for the production of sulfoaluminate-based cement are less than those for Portland cement, given less temperature is required for the different chemical reactions to occur in the kiln and also because lesser amounts of calcite are required and between 30% and 37% lesser limestone (Bernardo G., Telesca A 2006) as raw materials, whose breakdown reaction is endothermal. The heat of formation of the Portland cement base compound (Alite=$C_3S$) requires 1848 kJ/kg, whereas Ye'elimite requires only 800 kJ/kg, which theoretically reduces the energy requirement 57%, and lesser $CO_2$ emissions given lesser fuel consumption.

In the search for products and processes allowing energy efficiency and cost reduction, different developments based on CSA-based cements have been carried out. These variations are mainly focused on differences in the content of mineral phases (Ye'elimite, belite, calcium aluminates, calcium sulfosilicates, among others), which in general results in an environmentally friendly product. Therefore, many products have been generated which are mentioned below:

The document "Industrially interesting approaches to low-CO2 low-$CO_2$ cements" (2004), discloses cement compositions based on calcium sulfate. Among these compositions, there are calcium-belite-ferrite sulfoaluminate cements, the so called "Third Cement Series" in China (TCS), and other similar systems which make good use of synergies between calcium sulfate, calcium silicate and calcium aluminate. However, in spite of the benefits that are offered by these types of cements, new developments are still required in order to overcome problems regarding processes and reactivity, as well as for establishing the durability of concretes made with these cements.

WO2011158109 refers to a type of cement with high alite and belite content (70% and 40%, respectively), which results similar to Portland cement, containing a low percentage of Ye'elimite (up to 15%). This material is synthesized up to 1350° C. having enhanced mechanical features, since it presents an increase in compression resistance (resistance increments from 25 to 50%) in all the product ages. The subject invention focuses on a sulfoaluminate cement. Therefore, it differs substantially from that proposed in the hereinabove referred document, which contains a lesser percentage of the title phase and is similar to ordinary Portland cement, with high percentages of the crystalline phase called Alite ($C_3S$, cement nomenclature). This Alite phase is not present in the subject invention. Moreover, the new invention develops higher strengths at an early age (1 day).

In the document "Thermal Behavior of Materials Based on Calcium Sulfoaluminate Cement" ((2007), different compositions based on sulfoaluminate-based cements are disclosed, such as pastes or mortars, wherein the base of the cement comprises: Ye'elimite 60.9 to 66.0, belite 15.6 to 17.4, perovskite 7.9 to 9.9, mayenite ($C_{12}A_{17}$) 7.1 and ferroaluminate 7.9 ($C_4AF$). However, said document does not describe the structural features of the main components of the cement base, nor does it consider its effect on the setting and the strength of the pastes thereof.

It is also usual to find in prior art concrete mixes based on CSA and Portland cement for different applications, knowledge that is of public domain. For example, "New Applications of Calcium Sulfoaluminate Cement. Cement and Concrete Research (2004)", discloses mixes between CSA-based cement comprising: belite 11%, Ye'elimite 84%, ferrite 4% and perovskite 1%, mixed with 30% phosphogypsum and Portland cement for high initial strength concrete generation with good workability.

Likewise, the market offers different cement compositions based on CSA, such as the one known under the distinctive mark "Italcementi" that produces a clinker based on CSA and belite ($C_2S$), which is used in tertiary mixes with Portland cement and calcium sulfate. This mix shows an enhanced initial and progressive strength, as well as less setting time. Particularly, the CSA based clinker is mainly comprised of: Ye'elimite ($C_4A_3S$) 60%, belite ($C_2S$) 18% and calcium silicate (CS) 9%. Furthermore, it is characterized by a fineness of 4500 cm$^2$/g, a setting time of 25 to 50 minutes and mechanical strength development greater than 60 Mpa up to 28 days. "Cementos Chiguagua" also has a CSA type cement which is belite-sulfate-aluminous, with close to 66% belite and 33% Ye'elimite, which is characterized by its high early strength and short setting times.

Even though this cement has been widely developed in countries like China, Italy and others, its use and applications show differences regarding the direct relationship between the proportion of minerals and the performance of these type of cements. In fact, studies such as the Aranda M. et al., 2013, focuses on identifying the crystalline compounds prevailing in some cement formulations constituted by different minerals typical of the CA based cement, particularly those Ye'elimite derived crystalline compounds Ye'elimite, but it does not identify the particular features of these more important crystalline phases of the CSA based cement (calcium sulfoaluminates), nor its associated technical effect.

The above demonstrates that none of the mentioned disclosures allows to establish the crystalline constituents, nor the proportions to obtain the best performance of the CSA-based cement product, namely, mechanical strength development, workability, short setting times, expansion, much less if these cements can be reproducibly obtained, both at a semi-industrial and industrial scale.

Therefore, the present invention corresponds to a cement formulation based on sulfoaluminate comprising a specific Ye'elimite crystal proportion, having said formulation significantly enhanced and experimentally assayed strength and setting features.

3. DESCRIPTION OF THE INVENTION

The formulation of the subject invention is obtained by sintering between 1250 and 1300° C. a mix of 39 to 45% CaO, 31 to 35% $Al_2O_3$, 8 to 13% $SO_3$ and 2 to 12% $SiO_2$ under controlled conditions allowing to reach a proportion between the orthorhombic and cubic phases of Ye'elimite in an equal or greater ratio of 1.40.

Additionally, the formulation of the invention has a specific ratio between the dihydrate and anhydrous forms of calcium sulfate. Said ratio is comprised between 1.0 and 3.0, and a maximum silicon dioxide content of usually 5% is present, when natural raw materials are used for cement production.

Therefore, the results obtained in the present invention provide a calcium sulfoaluminate based cement (CSA) with high initial strength to compression >47 Mpa (in concrete) and short setting times between 30 and 60 minutes. Additionally, the cement composition of the present invention entails a reduction of $CO_2$ emissions of 25 to 29%, in comparison to Portland cement.

4. BRIEF DESCRIPTION OF THE DRAWINGS

5. DETAILED DESCRIPTION OF THE PRESENT INVENTION

Figure 1:
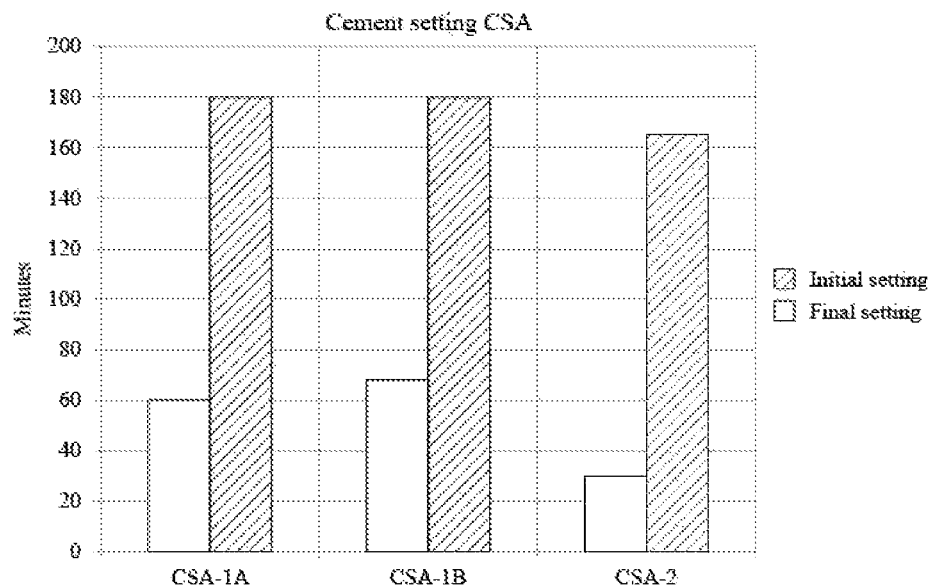
FIG. 1 shows a graphic with the setting times for the three invention cements, with different mineralogical compositions.

In diverse embodiments, the present disclosure describes a sulfoaluminate based cement formulation (CSA) comprising a specific proportion of Ye'elimite crystals. Preferably, the present invention is made with a sulfoaluminate based cement formulation comprising orthorhombic and cubic Ye'elimite crystals in a ratio greater or equal to 1.40. Some other embodiments of the present invention further comprise calcium salts in their dihydrate and anhydrous forms.

Three invention embodiments are exemplified wherein the calcium sulfoaluminate based cement shows different mineralogical compositions corresponding to different embodiments through which the present invention can be materialized, but without constituting a restriction thereof.

In one of the invention embodiments, the calcium salts correspond to dihydrate and anhydrous calcium sulfate in a ratio comprised between 1.0 and 3.0. The other components are related in Table 1. Said composition, describing the preferred invention embodiments, is obtained after sintering at temperatures between 1250 and 1300° C., a mix elaborated by dividing up materials allowing to reach a composition of about 39 to 45% CaO, 31 to 35% $Al_2O_3$, 8 to 13% $SO_3$ and 1 to 12% $SiO_2$.

Sintering a CSA cement at a temperature between a minimum of 1250° C. and a maximum of 1300° C.—according to the hereinabove described invention embodiments, wherein the temperature is reduced in about 250° C., in comparison to a Portland cement, generating almost null $C_3S$ contents and obtaining acceptable or superior performances of the CSA cement in comparison to the Portland cement. The sintering process is the most critical phase. Therefore, a stepped slope as a function of temperature should be established. Cooling is another critical phase in polymorph obtainment, reason why it must be controlled properly.

The cements obtained in the invention embodiments are basically composed of orthorhombic and cubic Ye'elimite, gypsum in dihydrate and anhydrous form and gehlenite. The other components are used according to the appropriate amounts, as illustrated in Table 1. The obtained cements are identified as CSA-2, CSA-1B and CSA-1A, whose Ye'elimite content decreases in the herein described order.

However, as an illustrative embodiment form, the detailed description has been exemplified with formulations for concrete. These same formulations can be used in any formulation of an industrial-use conglomerate.

TABLE 1

Minearologic composition of cements (the analysis were carried out in the Universidad Nacional de Colombia - Medellin)

| Compound | CSA-2 (% weight) | CSA-1B (% weight) | CSA-1A (% weight) |
|---|---|---|---|
| Orthorhombic Ye'elimite | 48.9 | 27.0 | 25.5 |
| Cubic Ye'elimite | 16.7 | 16.2 | 18.3 |
| $C_3S$ - Alita, Nishi et al | 0.3 | 0.0 | 0.8 |
| $C_2S$ - Belite(Mumme) | 4.6 | 7.4 | 4.9 |
| Gehlenite | 0.0 | 31.2 | 27.0 |
| $C_3A$ - Cubic Aluminate | 2.0 | 4.5 | 3.3 |
| Dihydrate calcium Sulfate-Gypsum | 22.7 | 5.5 | 10.9 |
| Calcium Sulfate - Anhydrous | 2.2 | 4.2 | 5.9 |
| Calcite | 0.4 | 1.3 | 1.9 |
| Quartz | 1.4 | 0.8 | 1.3 |
| Brownmillerite | 0.0 | 0.7 | 0.0 |
| Calcium Oxide | 0.1 | 0.0 | 0.3 |
| $C_3A$ | 0.6 | 0.4 | 0.1 |

The following assays are described: quick setting time check, high strength check and reduction of $CO_2$ emissions check.

FIG. 1 is related to the quick setting time check results. The obtained cements were evaluated according to the ASTM C191-01 norm [35] (equivalent to NTC 118). This procedure consists of knowing the initial setting time (IST) indicating the moment when the sample starts loosing plasticity and is shown when a 1 mm diameter needle of Vicat apparatus, Soiltest brand, penetrates 25 mm into the paste, and the final setting time (FST) indicating the moment when the sample begins gaining strength and the final reading is when the needle stops penetrating the paste. In FIG. 1, relatively quick setting time values are observed for the cement produced in this invention. Particularly, CSA-2 has the shortest initial setting time. This differential behavior is based in the particular crystalline composition of the cement proposed in this invention. The setting time is determined as established in norms ASTM C187 and ASTM C191.

The above results vary as to the initial and final setting for the three cements due to their varied mineralogical composition. However, the quick setting times obtained evidence one of the utmost important features of the CSA cement, referring to a quick hardening in contrast to Portland cement.

CSA-2 has lesser setting times, due to a greater orthorhombic Ye'elimite content, its high reactivity, and very low Gehlenite content, a non-hydraulic material. The setting values are described in the following table:

TABLE 2

Setting times in cements of the present invention

| Analysis | CSA-1A | CSA-1B | CSA-2 |
|---|---|---|---|
| Initial setting | 60 | 68 | 30 |
| Final setting | 180 | 180 | 165 |

As for CSA-1A and CSA-1B, the difference in the Ye'elimite and the dehydrated gypsum polymorph content establishes the difference between these two cements, which is reflected in the initial shortest setting time regarding the CSA-1A cement. The normal consistency, necessary for the setting time measure, was determined using norms ASTM C187 and ASTM C191.

Additionally, a high strength check was carried out on the different cement formulations of the subject invention. The mechanical performance of the compositions was evaluated measuring the compression resistances, where the determination of the concrete mix fluidity is first specified, using ASTM C1437, storage and in-water setting according to ASTM C349, until obtaining different hydration ages of 1, 3, 7 and 28 days.

TABLE 3

Mechanical resistance to compression of concrete

| Mechanical resistance | CSA-2 | CSA-1B | CSA-1A |
|---|---|---|---|
| 1 d (Mpa) | 37.5 | 21.0 | 22.7 |
| 3 d (Mpa) | 39.0 | 21.8 | 23.9 |
| 7 d (Mpa) | 41.0 | 23.2 | 26.4 |
| 28 d (Mpa) | 47.3 | 26.4 | 27.6 |

According to the above table, the concrete obtained with CSA-2 cement generates greater initial resistance to compression and fast development through time. This can be corroborated through the quick setting, which evidences a high reactivity of this particular cement that in turn is due to its previously referred mineralogical composition, as well as its orthorhombic/cubic Ye'elimite ratio and the lower presence of other non-reactive phases (as gehlenite).

The CSA-2 cement composition having a polymorphic ratio of orthorhombic to cubic Ye'elimite of >2.5, exhibits better performance. Compositions with a polymorphic ratio of orthorhombic to cubic Ye'elimite of >2.5, exhibit a greater development of mechanical resistances in concrete, namely, compression resistances at all ages.

Figure 2:
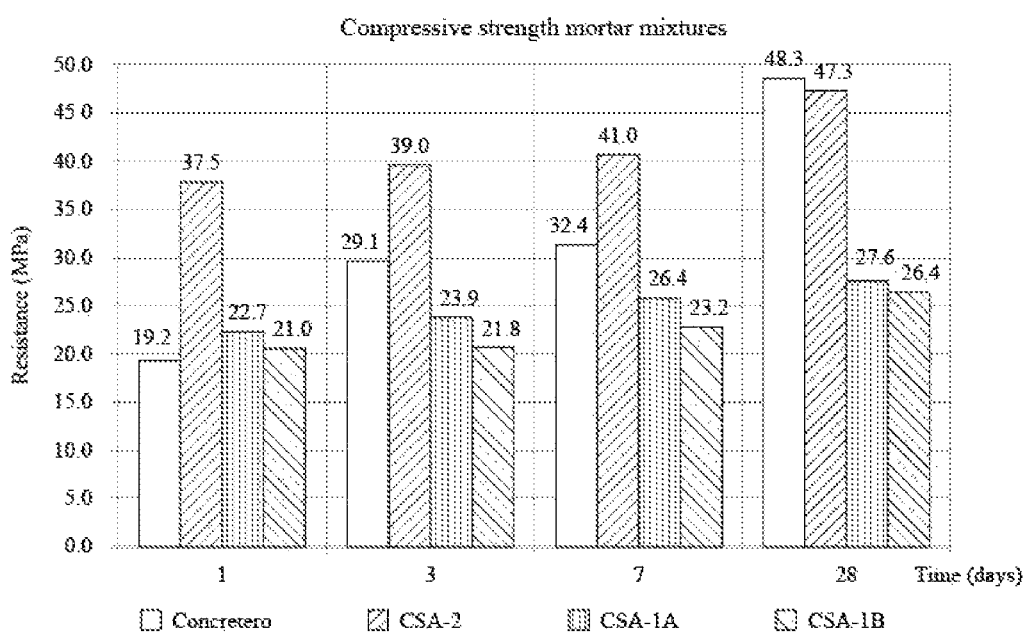
FIG. 2 illustrates a comparison graph of the resistance to compression of the three different concrete mixes according to the invention and a "concretero" type Portland cement.
Figure 3:
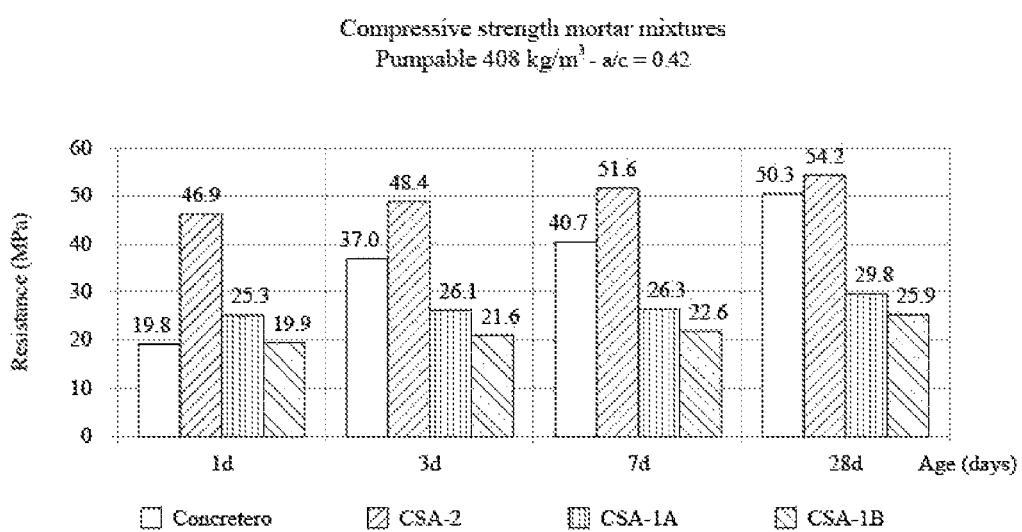
FIG. 3 shows how the minimum resistance obtained by one of the concretes produced with CSA (CSA-1A) cement reaches about 20 Mpa in 1 day, and how the higher resistance is achieved by the CSA-2 cement; about 55 Mpa in 28 days.

Furthermore, the concrete obtained with the CSA-2 mixture, for a mix design of 5000 psi, shows a high development of resistance at early ages, up until 28 days. It was compared against a type III Portland cement or "concretero" (local description for type III cement), showing superior performance, as illustrated in FIG. 3. This CSA concrete was produced identically as the Portland cement is produced, replacing only the amount of cement in the concrete mix. Like it was noted in the mortar (FIG. 2), the mix made with CSA-2 evidences a better behavior compared to other CSA mixes and to the Portland cement mortar (Concretero), at ages of 1, 3 and 7 days. In the concrete resistance evaluation (FIG. 3), the formulation with CSA-2 cement surpasses all the concretes used regarding compression resistances, including the concrete made with Portland cement. The CSA-2 concrete crystalline matrix allows for improving the compression resistance between 25 and 30% and its quick hardening allows for several alternatives when using CSA-2 cement in concrete.

FIG. 3 shows how the minimum resistance obtained by one of the concretes produced with CSA (CSA-1A) cement reaches about 20 MPa in 1 day, and how the higher resistance is achieved by the CSA-2 cement; about 55 MPa in 28 days.

In addition to the above, an evaluation of the reduction of the $CO_2$ emissions was carried out. The emission reduction that was evidenced in the production process was seen as high as 27%, and after grinding, it increased about 6% more. The amount of $CO_2$ emitted during the production of the different cements was measured. The data of the gas measurements and the reduction are shown in Table 3, where the CSA clinkers with a Portland clinker are compared.

TABLE 3

| | CO2 emissions | |
|---|---|---|
| Material | [%] CO2 | CO2 [%] Reduction |
| Portland Clinker | 20.45 | 0% |
| CSA 1Clinker | 14.25 | 27% |
| CSA 2Clinker | 15.05 | 23% |

The comparative assay carried out with a composition that does not comply with the orthorhombic/cubic condition of being greater or equal to 1.40 and the $CaSO_4 \cdot 2H_2O$/anhydrous ratio between 1.0 and 3.0, exhibited very poor performance.

It must be understood that although the present invention has been specifically disclosed by a preferred embodiment form and some optional features, any modification, improvement and variation of the invention in the present disclosed document is possible by persons skilled in the art. Moreover, such modifications, improvements and variations are considered as being within the scope of the invention. The components, formulations and examples provided herein are representative of preferred embodiments, i.e., they are examples and are not intended as limitations for the invention scope.

All the publications, patent applications, patents, commercially used methods herein mentioned are expressly attached only as reference.

The invention claimed is:

1. A calcium sulfoaluminate-based cement formulation, comprising:
    Ye'elimite ($C_4A_3S$) with a ratio between its orthorhombic crystalline system (o-$C_4A_3S$) and its cubic crystalline system (c-$C_4A_3S$) of 1.40 to 2.95, wherein the Ye'elimite is present in an amount between 43 to 66%;
    Calcium sulfate (CS) with a ratio between its dihydrate and anhydrous forms lower or equal to 10, wherein the calcium sulfate is present between 9 to 25%;
    and a maximum silica content of 12% (S).

2. The formulation of claim 1, further comprising:
    Felite, ferrite or Brownmillerite ($C_4AF$) less or equal to 1%,
    Belite ($C_2S$) from 4 to 8%,
    Alite ($C_3S$) less or equal to 1%,
    Calcite (CaO) from 0 to 4%.

3. The formulation of claim 1, further comprising one or more of the following minerals: Gehlenite ($C_2AS$), tricalcium aluminate ($C_3A$) and quartz.

4. The formulation of claim 1, mixed with at least water and arids to obtain concrete.

5. The formulation of claim 4, wherein the concrete shows 25 to 30% greater performance at early ages compared to the concrete obtained from Portland cement.

6. The formulation of claim 4, wherein the concrete is characterized by having a mechanical resistance at 1 day of hydration age of between 19 to 47 Mpa, and at 28 days of 25 to 55 Mpa.

7. The formulation of claim 4, showing quick setting compared to the concrete made with Portland cement.

8. The formulation of claim 1, wherein the Ye'elimite is obtained by sintering a mixture of: CaO (39 to 45%), $Al_2O_3$ (31 to 35%), $SO_3$ (8 to 13%) and $SiO_2$ (1 to 12%) at a temperature from 1250° C. to 1300° C.

9. The formulation of claim 8, wherein the sintering shows a reduction of $CO_2$ emissions of up to 27% compared with those produced with Portland cement.

* * * * *